March 17, 1953 W. PETERS 2,631,930
INFLAMMABLE GAS PRODUCING APPARATUS
Filed Sept. 30, 1948
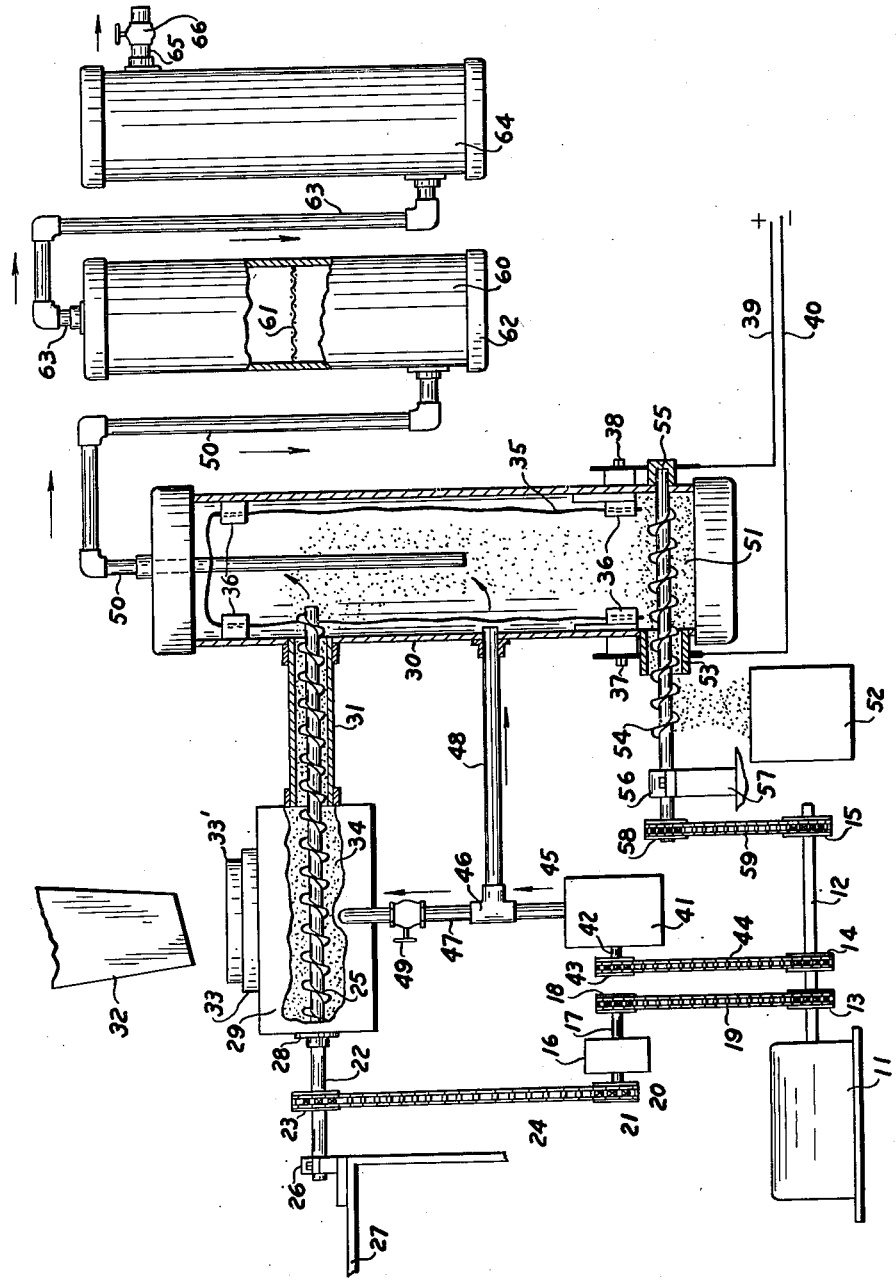
INVENTOR.
WALTER PETERS.
BY *Robert A. Sloman*
ATTORNEY.

Patented Mar. 17, 1953

2,631,930

UNITED STATES PATENT OFFICE 2,631,930

INFLAMMABLE GAS PRODUCING APPARATUS

Walter Peters, Detroit, Mich.

Application September 30, 1948, Serial No. 52,091

1 Claim. (Cl. 48—65)

This invention relates to apparatus for manufacturing gas from sawdust, and more particularly to a novel mechanism and method for collecting and transmitting sawdust to a heating chamber which under carbonizing conditions delivers an inflammable gas which may be used for illumination, for heating, and for other purposes, such as for internal combustion engines.

It is the principal object of this invention to provide a suitable apparatus for carbonizing sawdust under such atmospheric and heating conditions as to deliver the maximum, volatile content thereof.

These and other objects will be seen from the following specification and claim in conjunction with the appended drawing whose single figure is a partially diagrammatic elevational view of the apparatus employed.

Referring to the drawing the electric motor 11 turns the shaft 12 upon which are mounted the three sprocket gears 13, 14 and 15.

Speed reducer 16 has a drive shaft 17 carrying sprocket gear 18 which is interconnected with sprocket gear 13 by sprocket chain 19.

Said speed reducer has a driven shaft 20 carrying sprocket gear 21 for transmitting rotative motion to shaft 22 through the sprocket gear 23 thereon and the sprocket chain 24 interconnecting gears 21 and 23.

Shaft 22 carrying a sawdust feeding screw 25 is journalled at its left end through the bearing 26 carried upon the bracket 27, fragmentarily shown, the intermediate portion of shaft 22 being rotatably journalled through the bearing 28 at the left end of the hollow sawdust receiver 29.

Hollow upright heating chamber 30 is spaced from receiver 29 and its interior is in communication with the interior of chamber 30 by means of the hollow tube 31 which suitably interconnects the interiors of receiver 29 and the chamber or heating compartment 30.

The sawdust stored in a suitable bin not shown is delivered vertically through the chute 32 fragmentarily shown, from the lower end of which the sawdust drops through a circular opening in the annular throat 33 which is positioned upon the top of receiver 29 providing communication thereinto, with cover 33' off.

Rotatable sawdust feeding screw 25 projects through receiver 29, through the hollow connecting tube 31 and extends partially into the interior of the heating chamber 30. Upon rotation of the screw 25 it is clear that the sawdust 34 within receiver 29 is transmitted mechanically from said receiver, through tube 31 and into heating chamber 30 wherein it has a tendency to drop towards the bottom thereof.

Suitable electric resistance heating coils 35 are arranged within heating chamber 30 supported upon the brackets 36, and their free ends are in electrical contact with the terminals 37 and 38. Electrical power is supplied to the coils 35 through the leads 39 and 40 which respectively join the terminals 38 and 37 to effectively energize said coils.

Air compressor 41 has a drive shaft 42 carrying sprocket gear 43, and the latter is connected to the rotatable gear 14 by the interconnecting sprocket chain 44.

Compressed air is delivered through the pipe 45 to the T connection 46 from which extend the two compressed air delivery pipes 47 and 48. Pipe 47 extends into and is in communication with the interior of sawdust receiver 29 with hand operable valve 49 interposed.

Compressed air delivered into the interior of receiver 29 partially aerates the sawdust within receiver 29 and at the same time applies air pressure to the sawdust being delivered through the tube 31, to prevent the backing up of inflammable gas therethrough. At the same time said compressed air facilitates the transmission of the sawdust through the tube 31 and gives said sawdust an initial velocity as it is moved into heating chamber 30.

Compressed air delivery pipe 48 is also delivering air to the interior of chamber 30 to thereby agitate the sawdust particles maintaining them in a turbulent condition, to assist in the carbonization of the sawdust particles.

The air under pressure is such as to prevent a complete oxidation of the sawdust particles and at the same time provides a pressure head for the transmittal of the inflammable gas produced and delivered from the chamber 30 through the outlet pipe 50.

The heating source through the electric resistance elements 35 and the source of compressed air through the pipe 48 provide for the maximum accumulation of inflammable gases at the top portion of chamber 30 with the ashes accumulating in the bottom of heating chamber 30 as at 51.

A suitable hollow ash collector 52 is provided for the ashes which are delivered from the bottom of chamber 30 through the ejector pipe 53 which extends therefrom and which overlies collector 52. Ejector screw 54 is positioned within the lower portion of chamber 30 in engagement with the collecting ashes and rotates in such a direction as to continually remove the ashes 51 through the ejector pipe 53 for disposal.

The ejector shaft 54 is journalled at one end within the bearing 55 carried upon chamber 30 while its other end projects through a suitable bearing 56 mounted upon the bracket 57.

Said shaft carries a sprocket gear 58 at its outer end which is rotated by the sprocket gear 15 to which it is connected by the sprocket chain 59. Consequently with the motor 11 in operation the feed screw 22—25 is forcing sawdust continually into the chamber 30, by rotation in one direction, and at the same time the ejector screw 54 is effecting the continuous removal of ashes from the lower portion of chamber 30, by rotation in the opposite direction.

Simultaneously the compressor 41 is operated to supply a blast of compressed air through the pipes 47 and 48 for the purposes above set out. And with the heating coils electrically energized the carbonization process continues automatically and the maximum of inflammable gas is delivered from the chamber 30 to the pipe 50.

The latter is joined and extends into the lower portion of the intermediate filtering chamber 60 which has a central screen 61 to prevent the passage of any impurities or solid particles from chamber 30. Cover 62 at the lower end of filtering chamber 60 is removable as desired for cleaning out the lower portion of said filter from time to time.

The filtered inflammable gas is delivered from the top of filter chamber 60 through the pipe 63 which extends downwardly with its lower end providing communication into the lower portion of the collecting chamber 64. A suitable gas delivery pipe 65 extends from the top portion of collecting chamber 64, there being a suitable hand valve 66 provided thereon to control the delivery of the inflammable gas produced. Power leads 39 and 40 are preferably energized from a motor-generator set delivering 100–150 amps. at from 35–85 volts, for example.

Having described my invention reference should now be had to the claim which follows for determining the scope thereof.

I claim:

Apparatus for producing inflammable gas from sawdust comprising a hollow sawdust receiver having an openable cover, and a lateral outlet, an upright reaction chamber spaced from said receiver and having a sawdust inlet adjacent its upper end and an inflammable gas delivery pipe at its upper end, a sawdust delivery tube interconnecting said lateral outlet and said inlet, a rotatable conveyor screw positioned within said receiver and said tube and projecting into the interior of said chamber, a plurality of longitudinally extending electric resistent coils mounted within said reaction chamber and extending throughout its length, a compressed air source spaced from said receiver and chamber, a pipe interconnecting said source and the interior of said receiver, a branch pipe interconnecting said first pipe and a central interior portion of said chamber, an ash ejecting tube projecting from the lower end of said chamber, a rotatable conveyor screw within said chamber at its lower end and extending through said ejecting tube, a rotatable power source, and connections between said power source, said screws and said compressed air source for energizing the same, a gas collecting chamber joined to said delivery pipe and spaced from said reaction chamber, and an upright filtering chamber arranged intermediate said reaction chamber and said collecting chamber, with its opposite ends in respective communication with said delivery pipe for permitting the flow of gas through said filtering chamber and into said collecting chamber.

WALTER PETERS.

REFERENCES CITED

The following references are of record in the file of this patent:

UNITED STATES PATENTS

| Number | Name | Date |
|---|---|---|
| 901,232 | Eldred | Oct. 13, 1908 |
| 1,634,480 | Wickenden et al. | July 5, 1927 |
| 1,657,371 | Cross | Jan. 24, 1928 |
| 1,937,552 | Davis | Dec. 5, 1933 |
| 1,938,121 | Stevens | Dec. 5, 1933 |
| 2,094,946 | Hubmann | Oct. 5, 1937 |
| 2,111,579 | Winkler et al. | Mar. 22, 1938 |
| 2,388,348 | Stimson | Nov. 6, 1945 |
| 2,445,327 | Keith | July 20, 1948 |

FOREIGN PATENTS

| Number | Country | Date |
|---|---|---|
| 663,025 | Germany | Oct. 31, 1934 |
| 121,146 | Great Britain | Dec. 12, 1918 |